United States Patent [19]
Rennerfelt

[11] 3,871,786
[45] Mar. 18, 1975

[54] SHAFT COUPLING

[76] Inventor: Sven Beinhard Rennerfelt, Louhagegangen 4, Gothenburg, Sweden

[22] Filed: Feb. 5, 1973

[21] Appl. No.: 329,638

[30] Foreign Application Priority Data
Feb. 7, 1972 Sweden..........................1363/72

[52] U.S. Cl................. 403/300, 29/159.2, 64/2 R, 64/9 R, 192/114 T, 403/359
[51] Int. Cl............................................. F16d 1/12
[58] Field of Search............... 287/103 R, 104, 108; 64/9 R, 14; 74/462; 29/159.2; 403/286, 293, 298, 364, 359; 192/67 R, 108, 114 T

[56] References Cited
UNITED STATES PATENTS

| | | | |
|---|---|---|---|
| 1,541,007 | 6/1925 | Thiemer | 403/359 |
| 2,386,048 | 10/1945 | Harkness | 29/159.2 |
| 2,700,560 | 1/1955 | Hansen | 287/103 R |
| 2,716,334 | 8/1955 | Scott et al. | 287/103 R |
| 3,191,453 | 6/1965 | Hoven | 287/104 |
| 3,606,412 | 9/1971 | Helmer | 403/380 |

Primary Examiner—Werner H. Schroeder
Assistant Examiner—Conrad L. Berman
Attorney, Agent, or Firm—Newton, Hopkins & Ormsby

[57] ABSTRACT

A shaft coupling comprising three sections, i.e. two coupling shaft sections and an intermediate member interconnecting said coupling sections. External teeth are provided on said coupling sections, said teeth meshing with external teeth on said intermediate portion, the dimensional relations between the two sets of teeth being such that the inner diameter of the teeth on said intermediate member being larger than the inner diameter of the teeth on said coupling sections whereby easy assembly of the coupling and a certain angular adjustment between the two coupling sections are permitted, and also some flexibility and resiliency of the coupling.

6 Claims, 7 Drawing Figures

PATENTED MAR 18 1975　　　　　　　　3,871,786

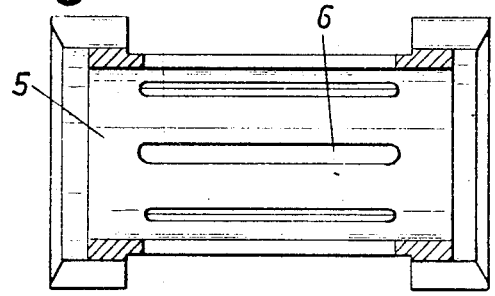
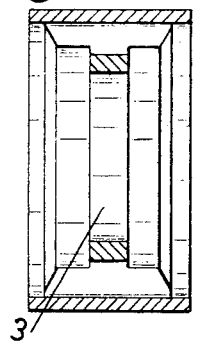
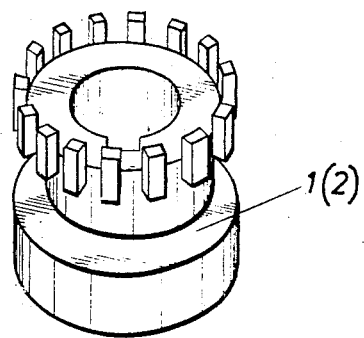

SHAFT COUPLING

BACKGROUND OF THE INVENTION

The present invention relates to shaft couplings and more particularly to an improved shaft coupling of the type comprising two coupling sections having external teeth and an intermediate member likewise provided with teeth engaging with the teeth on the coupling sections to interconnect said two shaft coupling sections.

It is known to manufacture couplings having external teeth meshing with a gear ring which has internal teeth and is concentrically arranged relative to the coupling. In arrangements of this kind the teeth of the internal gear ring may be arc-shaped to permit a certain angular adjustment.

SUMMARY OF THE INVENTION

In accordance with the teachings of the present invention the intermediate member likewise is provided with external teeth, the base portion of which below the pitch diameter being cut away to permit assembly of the coupling.

A further characteristic of the present invention is that the teeth of the coupling sections are undercut and only the fillet at the teeth base portions is cut away.

A coupling in accordance with the present invention with external gear will be compact in size, reduced as far as weight is concerned and in addition economical to manufacture. The possibility of reducing the dimensions of the coupling to a minimum involves several advantages, among them the following:

1. In many machines requiring interconnecting of shaft end sections by means of couplings the distance between the shafts is determined by the diameter of the coupling. Consequently, important advantages are gained by reducing the distance between the shafts, as this means that the weight and the price of the machine may be reduced.

2. It is desirable to provide a coupling made from a durable material, such as steel or stainless steel as the coupling will then be able to resist also the heaviest stresses, such as when it is exposed to corrosive atmospheres or high temperatures as may occur for instance when lubricant oils reach a temperature of close to 400°F.

3. A coupling which may be made entirely from steel and in accordance with up to date mass production techniques has less weight and consequently it entails less material costs than earlier couplings.

The purpose of the present invention thus is to provide a coupling of the smallest dimensions possible which may be adjusted radially and axially to accommodate for slight misalignments and which may also compensate for small angular deviations. Another purpose is to provide a coupling which may be precision made in modern rolling machines or gear planers.

The coupling in accordance with the invention comprises toothed wheels or gear rings, the base portions of which are cut away to permit the wheels to be interconnected. If the gear rings are formed with approximately 14 teeth they will be undercut and may be pushed into one another only if the fillet at the base portion is removed. This makes the remaining portion of the tooth all the stronger.

A coupling manufactured in accordance with the teachings of the present inventions will, upon angular adjustment abut against the teeth of the intermediate member along an obliquely cut surface of a cylinder, thus an ellipse. Because the sectional dimensions of the intermediate member are radially thin, this member will possess some elasticity and permit the pressure to be evenly distributed on all teeth. Owing to the fact that the intermediate member interconnects the two coupling sections while permitting a certain angular adjustment at both ends of said member, the intermediate member will function as a universal joint.

The coupling sections are made from hard or hardened material and some lubrication with permanent effect, as by means of molybdenum sulfide, is sufficient.

BRIEF DESCRIPTION OF THE DRAWING

The invention will be described more in detail in the following with reference to the accompanying drawing, wherein

FIG. 5 illustrates a modified embodiment of the intermediate member;

FIG. 6 illustrates the intermediate member provided with a protective covering sleeve, and FIG. 7 is a perspective view of one of the coupling sections.

DETAILED DESCRIPTION OF A PREFERRED EMBODIMENT

Figure 1:
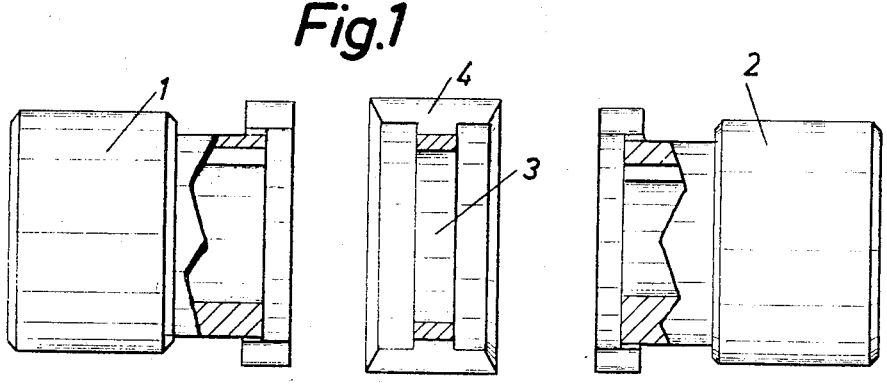
FIG. 1 illustrates the coupling sections in a non-assembled position.
Figure 2:
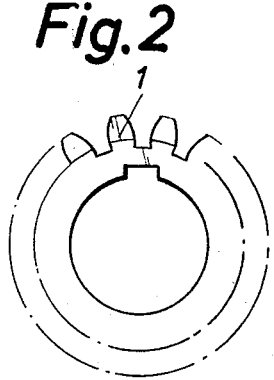
FIGS. 2, 3, and 4 are end views of the various coupling sections shown in FIG. 1.
Figure 3:
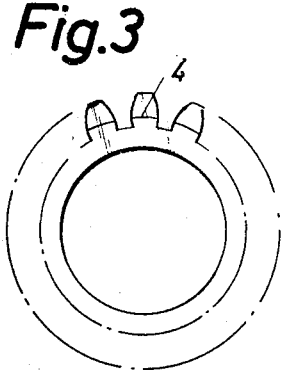
Figure 4:
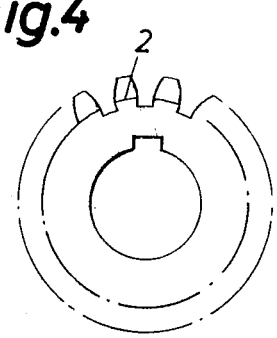

As appears from FIG. 1 the coupling sections 1 and 2 are formed as a hub one end of which is provided with a gear rim. The intermediate member 3 consists of a ring provided along its circumference with rod-like elements 4 the number and shape of which correspond to the teeth formed on coupling sections 1 and 2. The inner diameter of the rod-like elements 4 exceeds the inner diameter of the teeth circle of the coupling sections. Furthermore, the ends of the rod-like elements 4 are bevelled on their internal face to facilitate assembly of the various coupling sections.

In fitted or assembled condition of the coupling there is some play between coupling sections 1 and 2 and the annular middle portion of the intermediate portion 3 on either side thereof. Through this arrangement and owing to the characteristic design of the various coupling sections a certain angular adjustment of the shafts to be interconnected is permitted by means of the coupling in accordance with the present invention.

If desirable, a sleeve may be threaded over the intermediate portion 3 to protect it and also to serve as a guide upon assembly of the coupling (FIG. 6).

Because in accordance with the invention the intermediate member 3 has been formed with a centre bore (opening) of sufficient size to permit it to spring into an elliptic shape upon angular adjustment between the shafts, the risk that the contact between the teeth of the coupling sections and the rod-like elements of the intermediate member will deteriorate is completely or partly eliminated.

To obtain good resilience of the intermediate member 3 a number of axial slits 5 may be made therein as appears from FIG. 5, illustrating a modified version of the intermediate member in accordance with the invention.

It should be apparent to those skilled in the art that the above embodiments of the invention are but examples and that the inventive object may be modified, altered and varied in many ways within the scope of the appended claims.

What I claim is:

1. In an assembly for coupling two shafts disposed at least substantially in alignment with each other, the combination of:
   a pair of shaft-associated sections having spaced, mutually opposed end portions; and
   an intermediate section disposed between and joining said shaft-associated sections; wherein the improvement comprises:
   an end portion on each of shaft-associated sections, each such end portion including a body having a series of external gear teeth integrally joined to the associated body for a portion only of the widths of the gear teeth whereby to project axially beyond said associated body and to define open spaces between adjacent pairs of gear teeth; said intermediate section including an annular body having external gear teeth integrally joined to said annular body for a portion only of the widths of the gear teeth and projecting axially beyond said annular body on opposite sides thereof and defining two sets of open spaces between adjacent pairs of teeth, one on one end of said annular body and the other on the other end thereof, the projecting base portions of at least those axially projecting portions of the gear teeth on opposite sides of said intermediate section being undercut by an amount sufficient to allow axial interdigitation between such axially projecting portions and the axially projecting gear teeth portions of the respective shaft-associated sections, said annular body of the intermediate section being of sufficiently thin radial thickness to permit deformation of said annular body into eliptical form.

2. In a coupling assembly as defined in claim 1 wherein the base portions of the axially projecting gear teeth portions of said shaft-associated sections are also undercut.

3. In a coupling assembly as defined in claim 1 wherein said annular body is elongate.

4. In a coupling assembly as defined in claim 3 wherein said annular body is provided with circumferentially spaced slots therearound extending between said separate sets of external gear teeth.

5. In a coupling assembly as defined in claim 2 wherein said annular body is elongate.

6. In a coupling assembly as defined in claim 5 wherein said annular body is provided with circumferentially spaced slots therearound extending between said separate sets of external gear teeth.

* * * * *